(12) United States Patent
Ichien et al.

(10) Patent No.: US 10,361,562 B2
(45) Date of Patent: Jul. 23, 2019

(54) POWER CONTROL SYSTEM, POWER MANAGEMENT APPARATUS, AND POWER CONTROL METHOD

(71) Applicant: NEC Corporation, Minato-ku, Tokyo (JP)

(72) Inventors: Masumi Ichien, Tokyo (JP); Norihisa Iga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 22 days.

(21) Appl. No.: 15/533,404

(22) PCT Filed: Dec. 10, 2015

(86) PCT No.: PCT/JP2015/006169
§ 371 (c)(1),
(2) Date: Jun. 6, 2017

(87) PCT Pub. No.: WO2016/098322
PCT Pub. Date: Jun. 23, 2016

(65) Prior Publication Data
US 2017/0346285 A1 Nov. 30, 2017

(30) Foreign Application Priority Data

Dec. 16, 2014 (JP) ................................ 2014-253548

(51) Int. Cl.
*G06F 1/32* (2019.01)
*H02J 3/14* (2006.01)
(Continued)

(52) U.S. Cl.
CPC ............... *H02J 3/14* (2013.01); *G05B 15/02* (2013.01); *G06F 1/266* (2013.01); *G06F 1/3209* (2013.01);
(Continued)

(58) Field of Classification Search
CPC ........ H02J 3/14; H02J 13/0006; G05B 15/02; G06F 1/266; G06F 1/3209; G06F 1/3287; G06Q 50/06; G06Q 30/0215
See application file for complete search history.

(56) References Cited

U.S. PATENT DOCUMENTS 9,830,671 B2 * 11/2017 Joko ..................... G06Q 50/06
2002/0024332 A1 * 2/2002 Gardner .................. H02J 3/14
324/103 R
(Continued)

FOREIGN PATENT DOCUMENTS

JP 2006-074952 A 3/2006
JP 4310235 B2 8/2009
(Continued)

OTHER PUBLICATIONS

International Search Report for PCT Application No. PCT/JP2015/006169, dated Feb. 16, 2016.
(Continued)

*Primary Examiner* — Brian W Wathen
*Assistant Examiner* — Brian T McMenemy

(57) ABSTRACT

A power control system with a power management apparatus and a power monitoring control apparatus for each control segment. The power monitoring control apparatus is provided with: a contribution degree setting unit setting the degree of contribution of each control segment; a device control unit controlling the power consumption of each power using device connected; a priority control unit setting a priority for reducing the power of the power using device; and a device monitoring unit obtaining the priority of each power using device and transmitting the obtained priority to the power management apparatus. The power management apparatus is provided with an optimum control calculation unit determining a control command for controlling each power using device connected. The control command is
(Continued)

determined based on: a target value of the total power consumption of all the control segments; the degree of contribution; and the priority of each power using device.

5 Claims, 10 Drawing Sheets

(51) Int. Cl.
    *G06Q 50/06*         (2012.01)
    *H04Q 9/00*          (2006.01)
    *G05B 15/02*         (2006.01)
    *G06F 1/26*          (2006.01)
    *G06F 1/3209*       (2019.01)
    *G06F 1/3287*       (2019.01)
    *G06Q 30/02*         (2012.01)
    *H02J 13/00*         (2006.01)

(52) U.S. Cl.
    CPC ....... *G06F 1/3287* (2013.01); *G06Q 30/0215* (2013.01); *G06Q 50/06* (2013.01); *H02J 13/0006* (2013.01); *H04Q 9/00* (2013.01); *H02J 2003/143* (2013.01); *H04Q 2209/84* (2013.01); *H04Q 2209/88* (2013.01); *Y04S 50/14* (2013.01)

(56) References Cited

U.S. PATENT DOCUMENTS

| | | | |
|---|---|---|---|
| 2008/0178029 A1* | 7/2008 | McGrane | G06F 1/3203 713/324 |
| 2010/0088261 A1* | 4/2010 | Montalvo | H02J 3/14 706/15 |
| 2011/0184581 A1* | 7/2011 | Storch | G06Q 10/06 700/295 |
| 2012/0323395 A1 | 12/2012 | Sato et al. | |

FOREIGN PATENT DOCUMENTS

| | | |
|---|---|---|
| JP | 2012-205358 A | 10/2012 |
| JP | 2013-005574 A | 1/2013 |
| JP | 2014-150627 A | 8/2014 |

OTHER PUBLICATIONS

English translation of Written opinion for PCT Application No. PCT/JP2015/006169.

* cited by examiner

Fig. 3

| CONTROL SEGMENT | DEGREE OF CONTRIBUTION |
|---|---|
| 400 | 0.8 |
| 410 | 0.6 |
| 420 | 0.4 |

Fig. 4

| CONTROL SEGMENT | DEVICE |
|---|---|
| 400 | 105 |
| 400 | 106 |
| 410 | 205 |
| 410 | 206 |
| 420 | 305 |
| 420 | 306 |

Fig. 5

| DEVICE | PRIORITY OF DEVICE | DEVICE STATE INFORMATION |
|---|---|---|
| 105 | 40 | ... |
| 106 | 60 | ... |
| 205 | 70 | ... |
| 206 | 90 | ... |
| 305 | 20 | ... |
| 306 | 30 | ... |

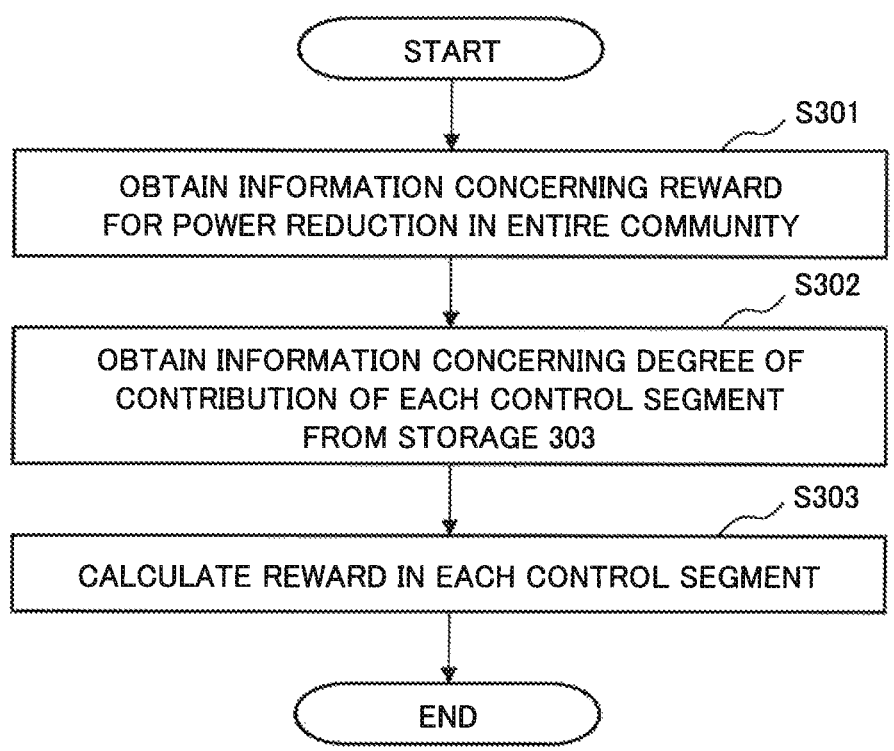

POWER CONTROL SYSTEM, POWER MANAGEMENT APPARATUS, AND POWER CONTROL METHOD

This application is a National Stage Entry of PCT/JP2015/006169 filed on Dec. 10, 2015, which claims priority from Japanese Patent Application 2014-253548 filed on Dec. 16, 2014, the contents of all of which are incorporated herein by reference, in their entirety.

TECHNICAL FIELD

The present invention relates, for example, to a power control system, a power management apparatus, a power monitoring control apparatus, and a power control method for performing control for power reduction in an entire community.

BACKGROUND ART

In systems which control power, a system which controls power for each community including sets of homes and business operators is known. This power control system individually controls the power of each home or the like constituting a community so as to keep the power in the entire community as low as a target value.

An example power control system is disclosed in PTL 1. The power control system disclosed in PTL 1 measures the power of each individual household appliances, collects the measurement results, determines the household appliances and reduction methods necessary for optimum reduction from their individual values, the amount of power value in an entire home, and the operation states of the household appliances, and individually controls the household appliances.

CITATION LIST

Patent Literature

[PTL 1] Japanese Unexamined Patent Application Publication No. 2006-074952
[PTL 2] Japanese Patent No. 4310235

SUMMARY OF INVENTION

Technical Problem

Unfortunately, in the technique disclosed in above-mentioned PTL 1, since the levels of priority of devices between respective homes are less comprehensible, control is less likely to be performed as expected priorities. This happens because the respective homes have different senses of priority. When, for example, the priorities of devices are set on a scale of 1 to 100, one home A sets 40 for a device considered to have a low priority and 60 for a device considered to have a high priority, while another home B sets 70 for a device considered to have a low priority and 90 for a device considered to have a high priority. In collectively controlling these homes, the device set as a high-priority device in the home A is controlled as a low-priority device overall. This poses a problem in the technique disclosed in PTL 1, resulting from the incapability of controlling power reduction for an entire community in accordance with the situations of each home and business operator.

It is an example object of the present invention to provide a power control system and a power control method which can solve the above-described problem. More specifically, it is an example object of the present invention to provide, for example, a power control system and a power control method which enable power reduction control for an entire community in accordance with the situations of each home and business operator.

Solution to Problem

A power management apparatus in an aspect of the present invention determines a control command for controlling each power using device to be connected, based on a target value of a total power consumption of all control segments to be connected, a degree of contribution set by a power monitoring control apparatus provided for each control segment, and a priority for the each power using device obtained from the power monitoring control apparatus provided for the each control segment, and transmits the determined control command to each power monitoring control apparatus.

A power monitoring control apparatus in an aspect of the present invention includes contribution degree setting means for setting a degree of contribution in a control segment to which the power monitoring control apparatus belongs, device control means for controlling a power consumption of a power using device to be connected in the control segment to which the power monitoring control apparatus belongs, based on a control command from a host apparatus, priority control means for setting a priority for the power using device, and device monitoring means for obtaining the priority of the power using device set by the priority control means and transmitting the obtained priority to the host apparatus.

A power control system in an aspect of the present invention includes a power management apparatus and a power monitoring control apparatus provided for each control segment. The power monitoring control apparatus includes contribution degree setting means for setting a degree of contribution in the each control segment, device control means for controlling a power consumption of each power using device to be connected in the each control segment, based on a control command from the power management apparatus, priority control means for setting a priority for reducing power of the each power using device, and device monitoring means for obtaining the priority of the each power using device set by the priority control means and transmitting the obtained priority to the power management apparatus. The power management apparatus determines the control command for controlling the each power using device to be connected, based on a target value of a total power consumption of all the control segments to be connected, the degree of contribution obtained from the power monitoring control apparatus provided for the each control segment and set by the contribution degree setting means, and the priority of the each power using device obtained from the device monitoring means of the power monitoring control apparatus provided for the each control segment, and transmits the determined control command to each power monitoring control apparatus.

A power control method in an aspect of the present invention includes, by a power monitoring control apparatus, setting a degree of contribution in a control segment to which the power monitoring control apparatus belongs, and setting a priority of each power using device in the control segment, by a power management apparatus, determining a control command for controlling the each power using device to be connected, based on a target power of a total power consumption of all the control segments to be connected, the degree of contribution set by the power monitoring control apparatus provided for the each control segment, and the priority set by the power management apparatus, and transmitting the determined control command to the power monitoring control apparatus, and by the power monitoring control apparatus, controlling a power consumption of the each power using device to be connected, based on the control command from the power management apparatus.

A recording medium in an aspect of the present invention records a program for causing a computer to perform the process of determining a control command for controlling each power using device to be connected, based on a target power of a total power consumption of all control segments to be connected, a degree of contribution set by the power monitoring control apparatus provided for each control segment, and a priority for reducing power of the each power using device provided for the each control segment, and transmitting the determined control command to the power monitoring control apparatus.

Advantageous Effects of Invention

According to the present invention, power reduction control is enabled for an entire community in accordance with the situations of each home and business operator.

BRIEF DESCRIPTION OF DRAWINGS

FIG. 3 is a table illustrating example data of the degree of contribution of each control segment stored in a storage 303 according to the present example embodiment.

FIG. 4 is a table illustrating example data of mapping representing the correspondence between control segments and power using devices stored in the storage 303 according to the present example embodiment.

FIG. 5 is a table illustrating example data of the priority of each power using device stored in the storage 303 according to the present example embodiment.

FIG. 11 is a flowchart illustrating an overview of an operation for reward allocation calculation by the power control system 1010 according to the second example embodiment.

DESCRIPTION OF EMBODIMENTS

Example embodiments of the present invention will be described in detail below with reference to the drawings.

First Example Embodiment

Figure 1:
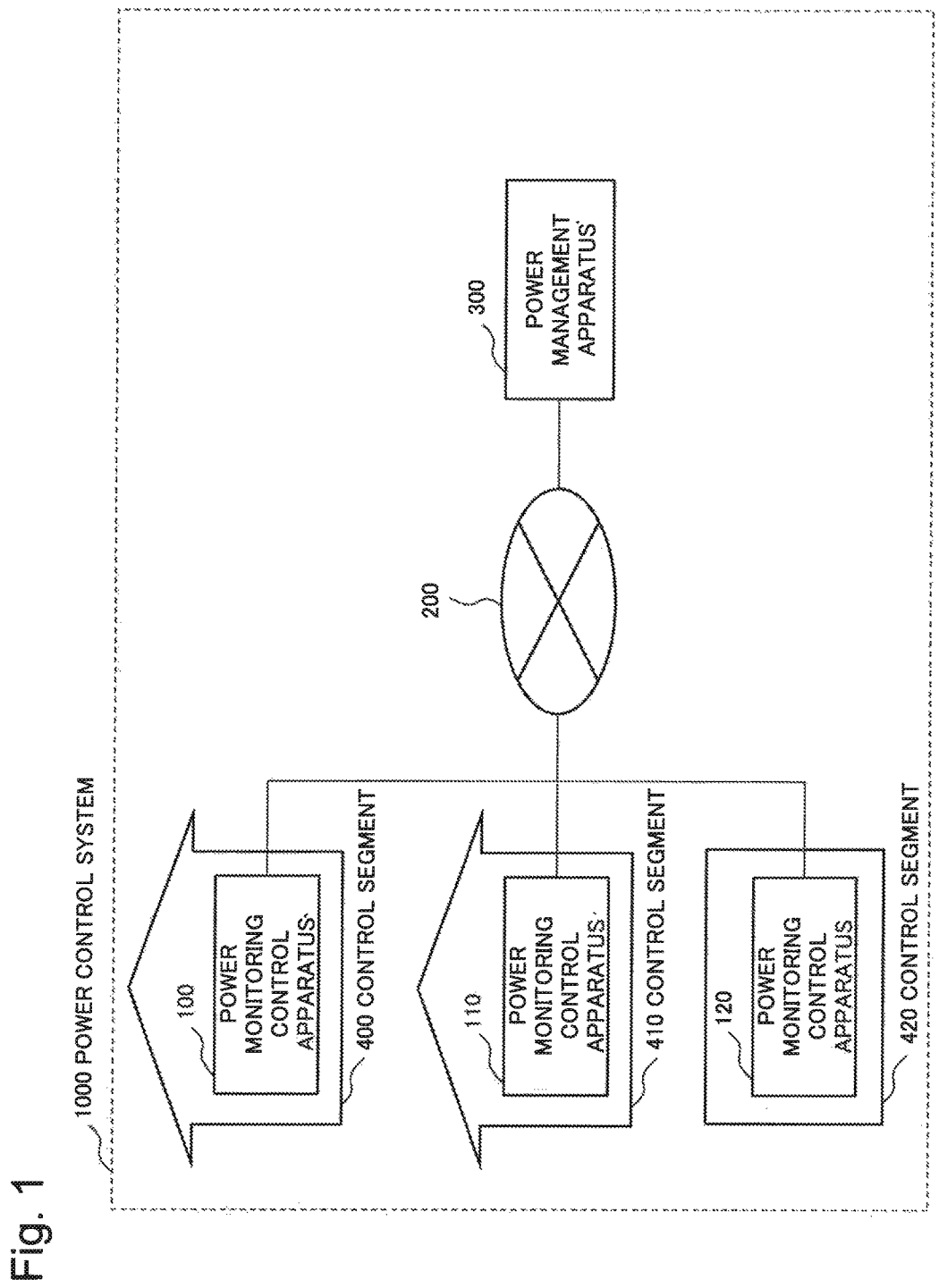
FIG. 1 is a block diagram illustrating the configuration of a power control system 1000 according to a first example embodiment of the present invention.

FIG. 1 is a block diagram illustrating the configuration of a power control system 1000 according to a first example embodiment of the present invention. Referring to FIG. 1, the power control system 1000 includes a power management apparatus 300, a power monitoring control apparatus 100 provided in a control segment 400, a power monitoring control apparatus 110 provided in a control segment 410, and a power monitoring control apparatus 120 provided in a control segment 420. The power management apparatus 300 is connected to the power monitoring control apparatuses 100, 110, and 120 via a communication network 200. Although three control segments and three power monitoring control apparatuses are mounted in the power control system 1000 illustrated in FIG. 1, the number of power monitoring control apparatuses connected to the power management apparatus 300 via the communication network 200 is not limited to three, and any number is applicable. Each of the control segments 400, 410, and 420 is defined as one segment in which power is collectively controlled, such as a house, an office, or the like.

Figure 2:
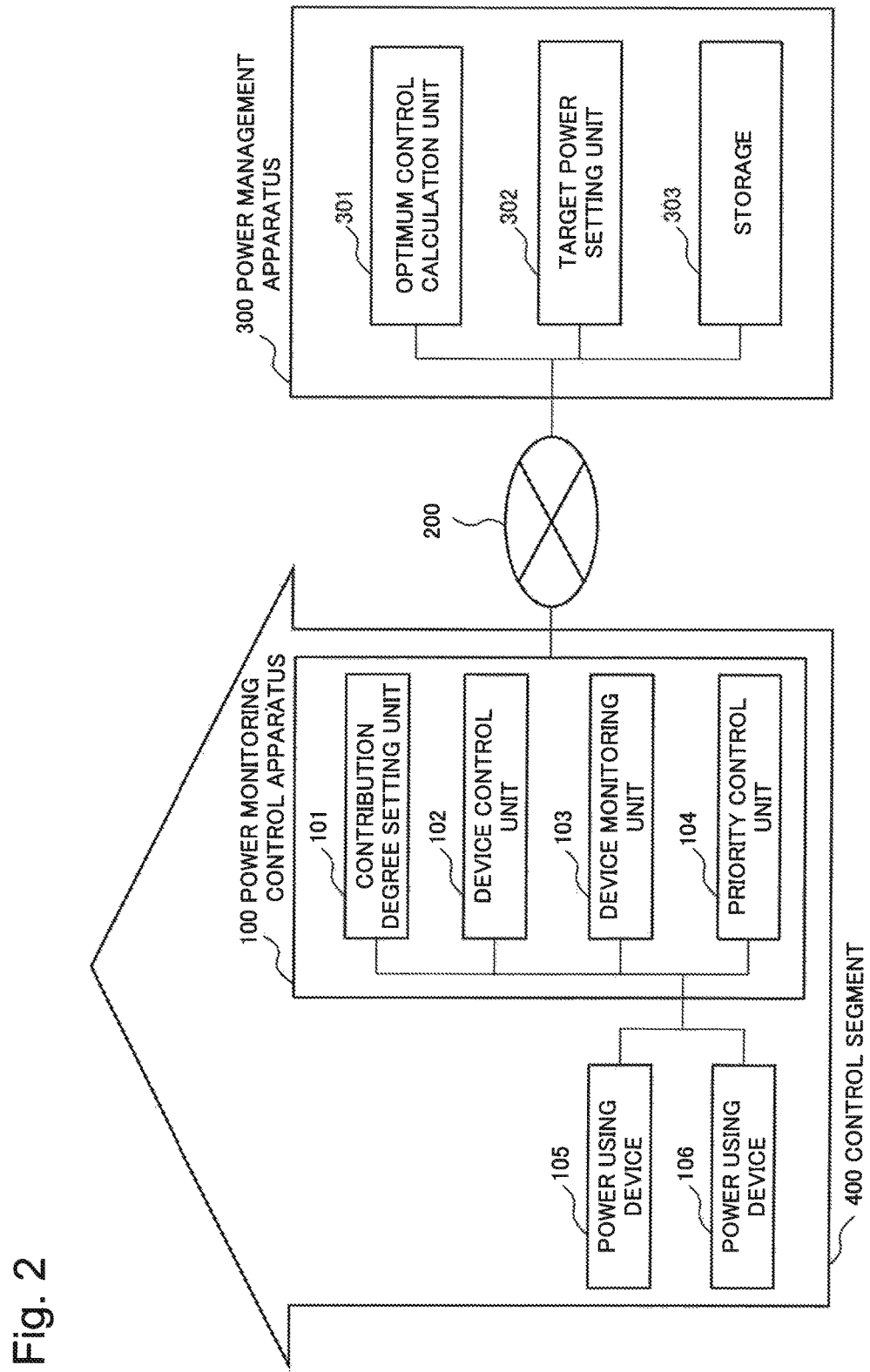
FIG. 2 is a block diagram illustrating the configuration and connection of a power monitoring control apparatus 100 in a control segment 400 and the configuration of a power management apparatus 300 according to the first example embodiment of the present invention.

FIG. 2 is a block diagram illustrating the configurations and the connection relationship of the power monitoring control apparatus 100 in the control segment 400 and the power management apparatus 300 according to the first example embodiment of the present invention. Referring to FIG. 2, the power monitoring control apparatus 100 includes a contribution degree setting unit 101, a device control unit 102, a device monitoring unit 103, and a priority control unit 104. The power monitoring control apparatus 100 is connected to power using devices 105 and 106 located in the control segment 400. Although two power using devices are depicted in FIG. 2, the number of power using devices is not limited to two, and any number is applicable. The power management apparatus 300 includes an optimum control calculation unit 301, a target power setting unit 302, and a storage 303.

The configuration of the power monitoring control apparatus 100 according to the first example embodiment will be described in detail below.

The contribution degree setting unit 101 sets a degree of contribution for the control segment 400 and transmits it to the power management apparatus 300. The degree of contribution means the degree of power reduction activity permitted by the control segment for a community to which each control segment belongs. More specifically, the contribution degree setting unit 101 sets the degree of contribution specified from three types of information: low, middle, and high, via an input unit such as a display or a switch (not illustrated) provided in the control segment 400. Alternatively, the degree of contribution may be specified between 0 and 1 by a slide bar. The contribution degree setting unit 101 may include, or be connected to an input unit. Any method is applicable to set the degree of contribution by the contribution degree setting unit 101, as long as the method allows a user who uses each power using device in the control segment 400 to set it by self-evaluation from an input unit (not illustrated).

The device control unit 102 receives control commands from the power management apparatus 300 and controls power for the power using devices 105 and 106 based on the control commands. More specifically, the device control unit 102 controls power based on ON/OFF control commands or control commands for changing the values (the air-conditioner set temperatures or the luminances of lighting fixtures) set in the power using devices 105 and 106.

The device monitoring unit 103 obtains state information for the power using devices 105 and 106 and transmits it to the power management apparatus 300. The state information includes at least information concerning the priorities of the power using devices 105 and 106. The state information may further include information concerning the above-mentioned current set values and power consumptions in the power using devices 105 and 106, and mapping information representing the correspondence between the control segment 400 and the power using devices 105 and 106.

The priority control unit 104 controls the priorities of control for power reduction of the power using devices 105 and 106. The priority of control means the relative degree of power control permitted for each power using device. For example, the higher the priority, the greater the degree of power control to be permitted may be, that is, the greater the influence of control may be. More specifically, the priority control unit 104 specifies the priorities of the power using devices 105 and 106 connected to the power monitoring control apparatus 100 between 0 and 100 via an input unit such as a display or a switch (not illustrated) provided in the control segment 400. Alternatively, the priority control unit 104 may specify the priorities of the power using devices 105 and 106 between 0 and 100 via an input unit such as a display or a switch (not illustrated) provided in each of the power using devices 105 and 106. Any method is applicable to specify the priorities by the priority control unit 104, as long as the method can set the order and ratio of priority of control for the power using devices 105 and 106. The priority control unit 104 may provide the priorities to the device monitoring unit 103 as one item of the above-mentioned state information.

The power using devices 105 and 106 use power in the control segment 400. The power using devices 105 and 106 can transmit and receive control commands and data to and from the power monitoring control apparatus 100 connected.

The configuration of the power management apparatus 300 according to the first example embodiment will be described below.

The optimum control calculation unit 301 determines the type of power control to be performed for a given power using device and transmits a control command to each power monitoring control apparatus 100 based on the determination. In this case, the optimum control calculation unit 301 determines a control command based on the information concerning the degree of contribution of each control segment stored in the storage 303, mapping representing the correspondence between control segments and power using devices, the priority of each power using device, and the target power.

The target power setting unit 302 sets a target power for the total power of all the control segments controlled by the power management apparatus 300 and transmits the target power set in the storage 303. The target power may be input via an input unit such as a display or a switch (not illustrated) provided in the power management apparatus 300, and set in the target power setting unit 302.

The storage 303 stores the degree of contribution of each control segment set in this control segment, mapping representing the correspondence between control segments and power using devices, the priority of each power using device, and the target power received from the target power setting unit 302. Assume herein that the mapping information representing the correspondence between control segments and power using devices has been set by the user who uses each power using device in each control segment or the administrator of the power control system and registered in the storage 303. The mapping information representing the correspondence between control segments and power using devices may be transmitted from a predetermined control unit of the power monitoring control apparatus 100 or the power management apparatus 300, such as the device monitoring unit 103, and stored in the storage 303 or updated, as appropriate.

FIG. 3 is a table illustrating example data of the degree of contribution of each control segment stored in the storage 303 according to the present example embodiment.

The data of the degree of contribution of each control segment illustrated in FIG. 3 includes the correspondence between the control segments 400, 410, and 420 and the degree of contribution set in each control segment. The degree of contribution of each control segment is represented by numerical values ranging from 0 to 1.

FIG. 4 is a table illustrating example data of mapping representing the correspondence between control segments and power using devices stored in the storage 303 according to the present example embodiment.

The data of mapping representing the correspondence between control segments and power using devices illustrated in FIG. 4 includes the correspondence between the control segments 400, 410, and 420 and power using devices in each control segment. The numbers of devices illustrated in FIG. 4 represent, for example, the identification numbers of respective power using devices. The power using devices in the control segment 410 (not illustrated in FIG. 2) are power using devices 205 and 206, and the power using devices in the control segment 420 (not illustrated in FIG. 2) are power using devices 305 and 306, as illustrated in FIG. 4. The number of power using devices in each control segment is not limited to two, as in the control segment 400.

FIG. 5 is a table illustrating example data of the priority of each power using device stored in the storage 303 according to the present example embodiment.

The data of the priority of each power using device illustrated in FIG. 5 includes the correspondence between the power using devices 105, 106, 205, 206, 305, and 306 and the priority of each power using device set in each control segment. Although the state information of each power using device may also be included, details of such device state information are not illustrated in FIG. 5.

Figure 6:
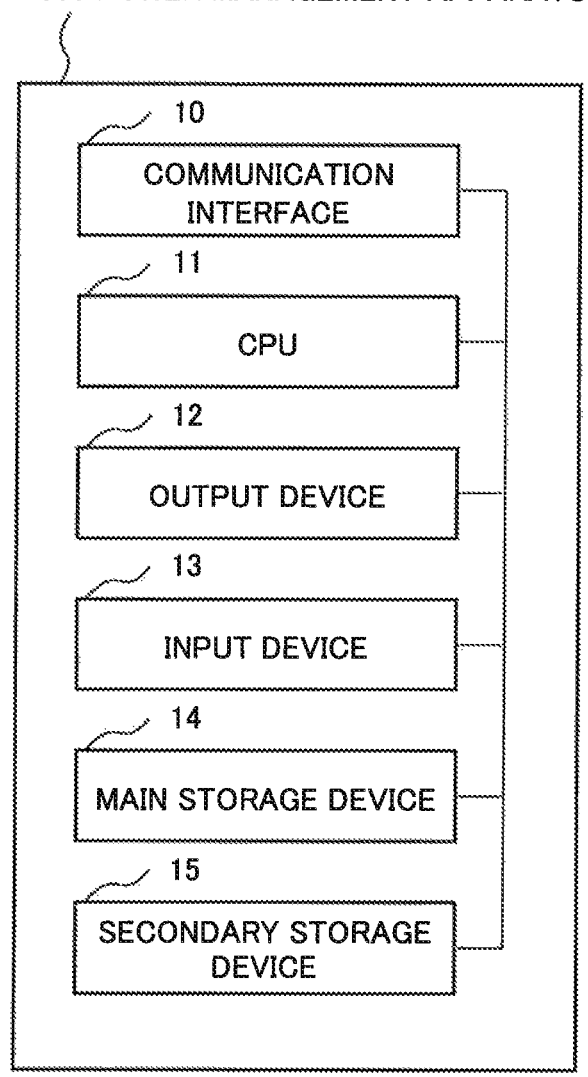
FIG. 6 is a diagram illustrating an example hardware configuration of the power monitoring control apparatus 100 and the power management apparatus 300, as implemented in computer apparatuses, according to the first example embodiment of the present invention.

FIG. 6 is a diagram illustrating an example hardware configuration of the power monitoring control apparatus 100 and the power management apparatus 300, as implemented in computer apparatuses, according to the first example embodiment of the present invention. Each of the power monitoring control apparatus 100 and the power management apparatus 300 includes a communication interface 10, a CPU (Central Processing Unit) 11, an output device 12, an input device 13, a main storage device 14, and a secondary storage device 15, as illustrated in FIG. 6.

The communication interface 10 implements an I/O interface for communication between a processing apparatus and a peripheral terminal. The communication interface 10 further includes an interface for connection control to a network (not illustrated) connecting to the power monitoring control apparatus 100 and the power management apparatus 300.

The CPUs 11 control the overall power monitoring control apparatus 100 and power management apparatus 300 according to the first example embodiment of the present invention by running the operating systems. The CPU 11 reads programs or data, for example, from the secondary storage device 15 to the main storage device 14. More specifically, the CPU 11 of the power monitoring control apparatus 100 operates as the contribution degree setting unit 101, the device control unit 102, the device monitoring unit 103, and the priority control unit 104 in the first example embodiment. The CPU 11 of the power management apparatus 300 operates as the optimum control calculation unit 301 and the target power setting unit 302 in the first example embodiment. The CPUs 11 of the power monitoring control apparatus 100 and the power management apparatus 300 respectively perform various processes in accordance with programmed control. Each of the power monitoring control apparatus 100 and the power management apparatus 300 may be provided with not limited to one but two or more CPUs 11.

The output device 12 is implemented in, for example, a display or an indicator and used to confirm output.

The input device 13 is implemented in, for example, a mouse, a keyboard, or a built-in key button and used for input operation. The input device 13 is not limited to a mouse, a keyboard, or a built-in key button, and it may be implemented in, for example, a touch panel.

The main storage device 14 serves as a working memory controlled by the CPU 11.

The secondary storage device 15 is, for example, an optical disc, a flexible disk, a magneto-optical disk, an external hard disk, or a semiconductor memory and computer-readably records computer programs. More specifically, the secondary storage device 15 of the power management apparatus 300 operates as the storage 303 in the first example embodiment. The secondary storage devices 15 temporarily or non-temporarily store computer programs to be executed by the power monitoring control apparatus 100 and the power management apparatus 300. The CPU 11 may load the computer programs recorded in the secondary storage device 15 and operate as the contribution degree setting unit 101, the device control unit 102, the device monitoring unit 103, and the priority control unit 104 of the power monitoring control apparatus 100 in accordance with the programs. Similarly, the CPU 11 may load the computer programs recorded in the secondary storage device 15 and operate as the optimum control calculation unit 301 and the target power setting unit 302 of the power management apparatus 300 in accordance with the programs.

Computer programs may be downloaded from an external computer (not illustrated) connected to a communication network.

Figure 7:
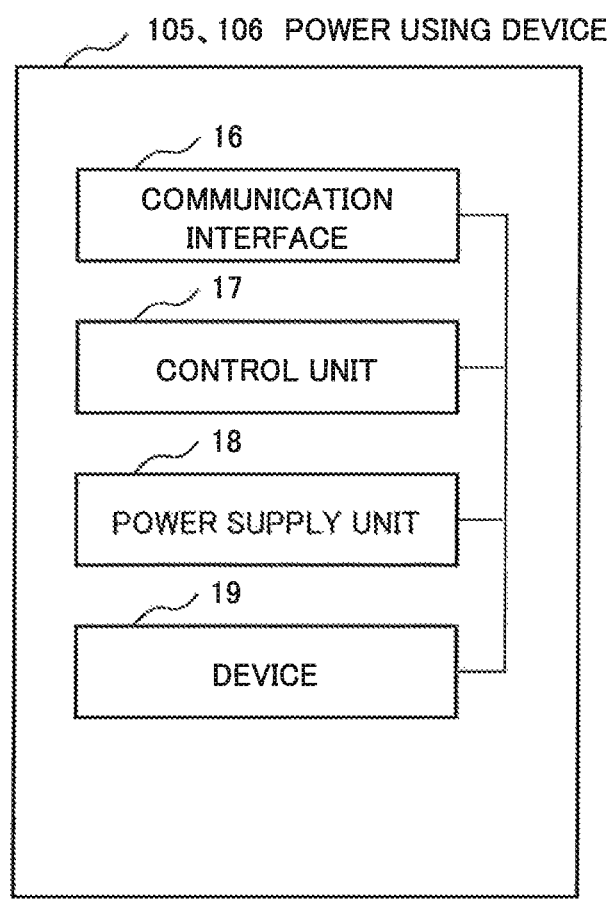
FIG. 7 is a diagram illustrating an example hardware configuration of power using devices 105 and 106 according to the first example embodiment of the present invention.

FIG. 7 is a diagram illustrating an example hardware configuration of the power using devices 105 and 106 according to the first example embodiment of the present invention. Each of the power using devices 105 and 106 includes a communication interface 16, a control unit 17, a power supply unit 18, and a device 19, as illustrated in FIG. 7.

The communication interface 16 implements an I/O interface for communication with the power monitoring control apparatus 100. The communication interface 10 allows transmission and reception of control commands and data between the power using devices 105 and 106 and the power monitoring control apparatus 100.

The control unit 17 controls power supply from the power supply unit 18 to the device 19 or changes the value set in the device 19, based on the control commands received from the power monitoring control apparatus 100.

The device 19 performs the actual operation processes of the power using devices 105 and 106.

The block diagram (FIG. 1) used to describe the first example embodiment represents function-specific blocks. These functional blocks are not limited to the computer apparatus illustrated in FIG. 6, and each unit may be implemented in a hardware circuit. However, the means for implementing each unit provided in the power monitoring control apparatus 100, the power management apparatus 300, and the power using devices 105 and 106 is not particularly limited. In other words, each of the power monitoring control apparatus 100, the power management apparatus 300, and the power using devices 105 and 106 may be implemented as one physically coupled apparatus or implemented as at least two physically separate apparatuses connected to each other in a wired or wireless manner.

The operation of the power control system 1000 configured as above will be described below with reference to flowcharts illustrated in FIGS. 8 and 9.

Figure 8:
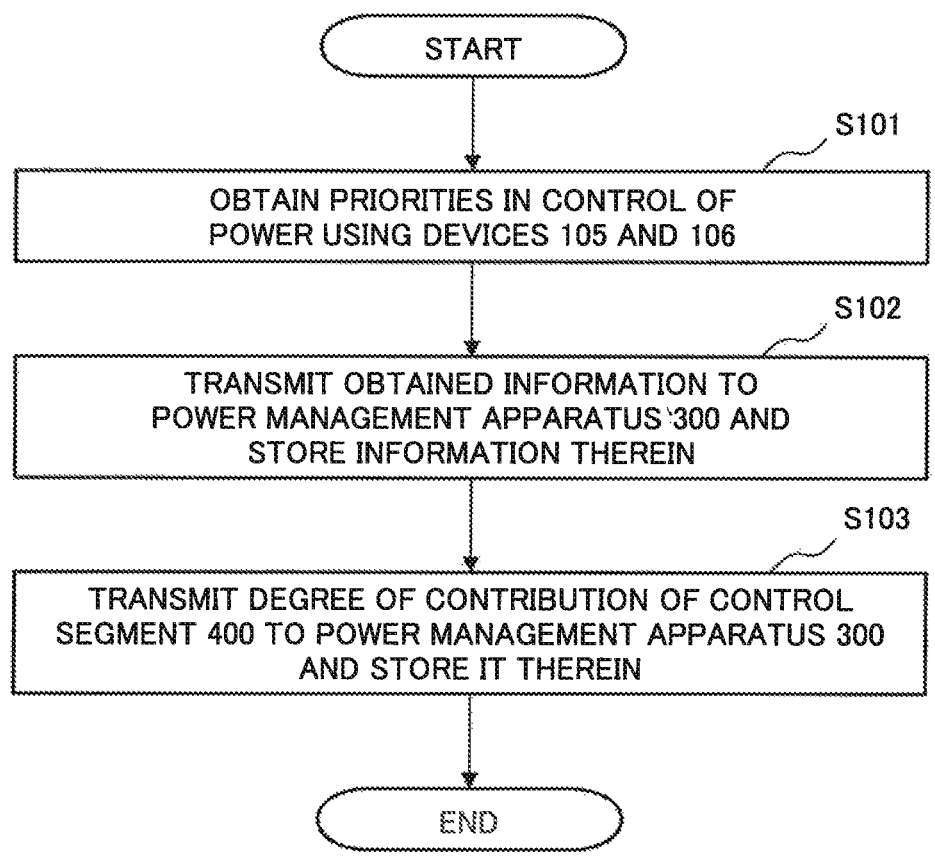
FIG. 8 is a flowchart illustrating an overview of an operation for obtaining device information by the power control system 1000 according to the first example embodiment.

FIG. 8 is a flowchart illustrating an overview of an operation for obtaining device information by the power control system 1000 according to the first example embodiment. The process according to this flowchart may be performed in accordance with the programmed control by the CPU described earlier.

The device monitoring unit 103, first, obtains the priorities in control of the power using devices 105 and 106 from the priority control unit 104 as state information (step S101), as illustrated in FIG. 8. The device monitoring unit 103 may also obtain information concerning the set values and the power consumptions of the power using devices 105 and 106, and mapping information representing the correspondence between the control segment 400 and the power using devices 105 and 106 from the device control unit 102 at this point in time.

The device monitoring unit 103 transmits the obtained information to the power management apparatus 300. The power management apparatus 300 then stores the received information in the storage 303 (step S102). In this way, the storage 303 stores, for example, the mapping data and the priority information illustrated in FIGS. 4 and 5.

The contribution degree setting unit 101 similarly transmits the set degree of contribution of the control segment 400 to the power management apparatus 300. The power management apparatus 300 then stores the received information in the storage 303 (step S103). In other words, the control segments and the degrees of contribution are associated with each other and stored, as illustrated in FIG. 3.

With the above-mentioned operations, the power control system 1000 ends the operation for obtaining device information. The process of obtaining device information is periodically executed, but its execution period may be determined as appropriate. The processes in steps S102 and S103 may be independently performed with different periods. The process in step S103 may be performed not periodically, but at the timing at which the contribution degree setting unit 101 changes the setting of the degree of contribution.

Figure 9:
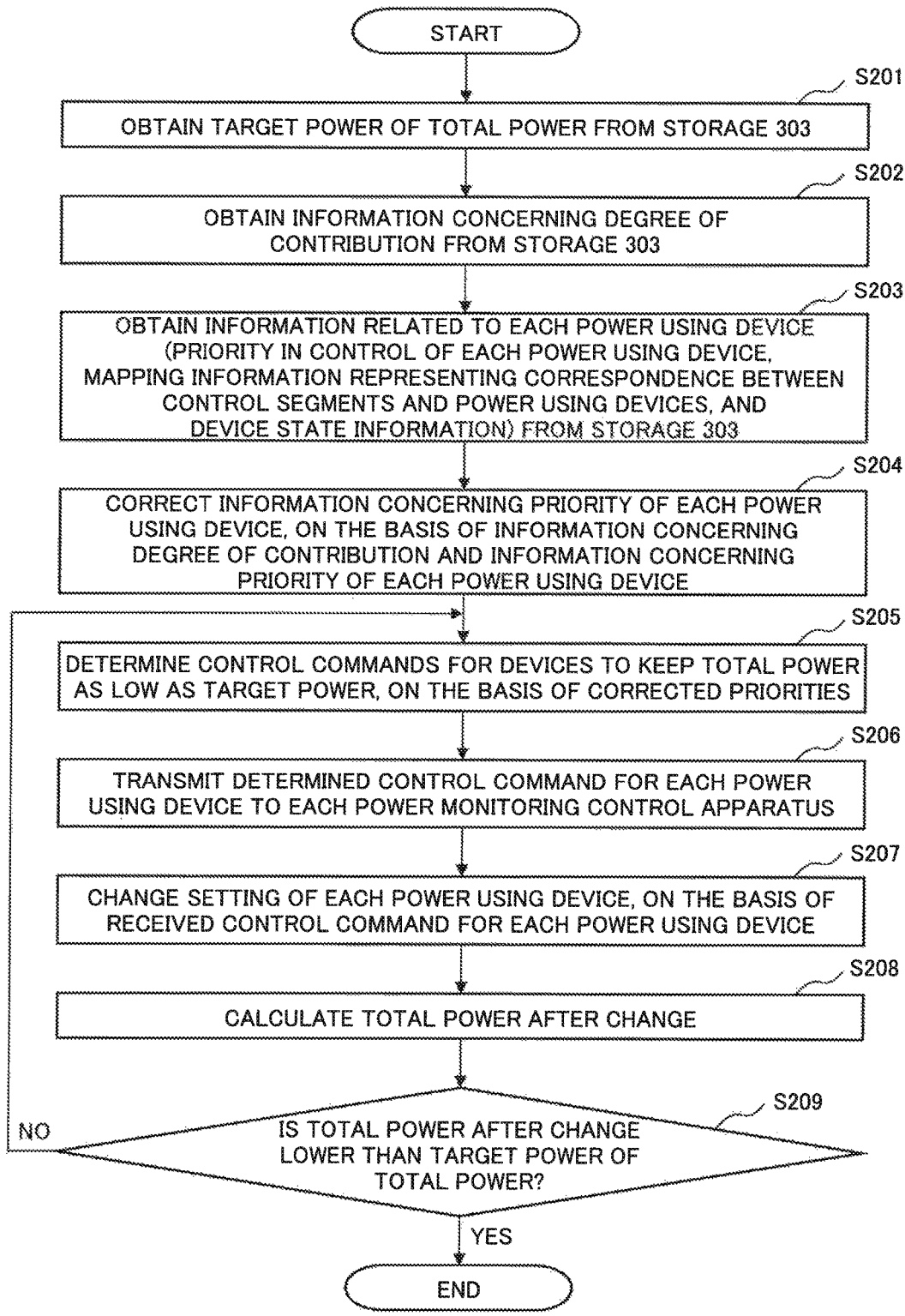
FIG. 9 is a flowchart illustrating an overview of an operation for issuing control commands to the power using devices 105 and 106 in the power control system 1000 according to the first example embodiment.

FIG. 9 is a flowchart illustrating an overview of an operation for issuing control commands to the power using devices 105 and 106 in the power control system 1000 according to the first example embodiment. The process according to this flowchart may be performed in accordance with the programmed control by the CPU described earlier.

The optimum control calculation unit 301, first, obtains the target power of the total power of all the control segments set by the target power setting unit 302 from the storage 303 (step S201), as illustrated in FIG. 9.

The optimum control calculation unit 301 then obtains from the storage 303, information concerning the degree of contribution set and transmitted by each contribution degree setting unit including the contribution degree setting unit 101 (step S202). The obtained information concerning the degree of contribution is as illustrated in FIG. 3.

The optimum control calculation unit 301 further obtains information related to each power using device from the storage 303 (step S203). The information related to each power using device includes the priority in control of each power using device in each control segment, mapping information representing the correspondence between control segments and power using devices, and device state information. The obtained mapping information representing the correspondence between control segments and power using devices is as illustrated in FIG. 4. The obtained information concerning the priority in control of each power using device is as illustrated in FIG. 5.

The optimum control calculation unit 301 corrects the information concerning the priority of each power using device, based on the obtained information concerning the degree of contribution, the obtained information concerning the priority of each power using device, and the obtained mapping information representing the correspondence between control segments and power using devices (step S204). Details are as follows. First, the degree of contribution of the control segment 400 is found to be 0.8 with reference to FIG. 3, and the devices associated with the control segment 400 are found to be the power using devices 105 and 106 with reference to FIG. 4. Based on these pieces of information, the priority of the power using device 105 is found to be 0.8×40=32 and that of the power using device 106 is found to be 0.8×60=48, with reference to FIGS. 3 and 5. Similarly, since the degree of contribution of the control segment 410 is 0.6 and the devices associated with the control segment 410 are the power using devices 205 and 206, the priority of the power using device 205 is 0.6×70=42 and that of the power using device 206 is 0.6×90=54. The optimum control calculation unit 301 performs the same calculation and correction for the remaining power using devices.

The optimum control calculation unit 301 determines device control commands for controlling the total power to reach the target power, based on the priorities corrected in step S204 (step S205). The method for determining device control commands is not particularly limited.

An example method for determining device control commands will be given hereinafter. Each power using device can control the power consumption by changing its set value. The optimum control calculation unit 301, first, determines the unit of control of the value set in each power using device. For example, 0.1% of the current power consumption of each power using device is defined as the unit of control. The optimum control calculation unit 301 then calculates values set in all the power using devices, based on the determined unit of control and the priorities corrected in step S204. When, for example, the corrected priority of the power using device 105 is 32 and that of the power using device 106 is 48, the set value for controlling the power using device 105 is determined as a set value which reduces the power consumption by 0.1%×32=3.2%. Similarly, the set value for controlling the power using device 106 is determined as a set value which reduces the power consumption by 0.1%×48=4.8%. The optimum control calculation unit 301 determines control commands for operation based on the calculated set values, for all the power using devices.

The optimum control calculation unit 301 may also determine a device control command by exploiting the priority-based control method for an energy device as described in PTL 2. In doing this, the optimum control calculation unit 301 may obtain device state information such as the power consumption of a power using device from each power monitoring control apparatus, as appropriate, to evaluate execution of control for keeping the energy less.

The optimum control calculation unit 301 transmits the determined control command for each power using device to each power monitoring control apparatus (step S206). In doing this, control commands for the power using devices 105 and 106 are transmitted to the power monitoring control apparatus 100.

The device control unit 102 changes the setting of each power using device based on the control command for each power using device received from the power management apparatus 300 (step S207). In the power monitoring control apparatus 100, the device control unit 102 changes the setting of the power using devices 105 and 106 based on the control commands for the power using devices 105 and 106 received from the power management apparatus 300.

The optimum control calculation unit 301 obtains the information concerning the power consumption after the change in setting of the power using device from each power monitoring control apparatus and calculates a total power after the change in setting of the power using device (step S208).

The optimum control calculation unit 301 confirms whether the total power after the change in setting of the power using device calculated in step S208 is lower than the target power of the total power of all the control segments obtained in step S201 (step S209). If the total power is lower than the target power (YES in step S209), the optimum control calculation unit 301 ends the process. If the total power is not lower than the target power (NO in step S209), the process returns to step S205, in which further control commands are determined. For example, the set value for controlling the power using device 105 is determined as a set value which further reduces the power consumption by 3.2%, that is, reduces it by 6.4% from the original state, and the set value for controlling the power using device 106 is determined as a set value which further reduces the power consumption by 4.8%, that is, reduces it by 9.6% from the original state. The optimum control calculation unit 301 performs this process until the total power after the change in setting of the power using device falls below the target power of the total power of all the control segments.

With the above-mentioned operations, the power control system 1000 ends the operation for issuing control commands to the power using devices 105 and 106.

The advantageous effect of the first example embodiment of the present invention will be described below.

The above-described power control system according to the present example embodiment can control power reduction for an entire community in accordance with the situations of each home and business operator.

This can be achieved because of the inclusion of the following configurations. That is, the power management apparatus 300 determines a control command for controlling each power using device connected, based on of the target value of the total power consumption of all control segments, the degree of contribution set by a power monitoring control apparatus provided in each control segment, and the priority of each power using device obtained from the power monitoring control apparatus provided in each control segment. The power management apparatus 300 then transmits the determined control command to each power monitoring control apparatus. Alternatively, the power monitoring control apparatus 100 is configured as follows. That is, first, the contribution degree setting unit 101 of the power monitoring control apparatus 100 sets the degree of contribution of the control segment 400 and its priority control unit 104 sets the priorities of control for the power using devices 105 and 106. Second, the optimum control calculation unit 301 of the power management apparatus 300 corrects the information concerning the priority of each power using device based on the degree of contribution of each control segment, and the priority in control of the power using device in this control segment that have been obtained from the corresponding power monitoring control apparatus. Third, the optimum control calculation unit 301 of the power management apparatus 300 determines device control commands for control to attain the target power, based on the corrected priorities. Fourth, the device control unit 102 of the power monitoring control apparatus 100 changes the setting of the power using devices 105 and 106 based on the control commands determined by the optimum control calculation unit 301. Thus, the power control system 1000 determines a control command for each device in consideration of both the priorities in control of the devices in each control segment and the degree of contribution of this control segment. The use of such a power monitoring control apparatus also enables power reduction control for an entire community in accordance with the situations of each home and business operator.

Second Example Embodiment

A second example embodiment of the present invention will be described in detail next with reference to the drawings. A description of details which are the same as in the foregoing description will be omitted below without giving an unclear description of the present example embodiment.

Figure 10:
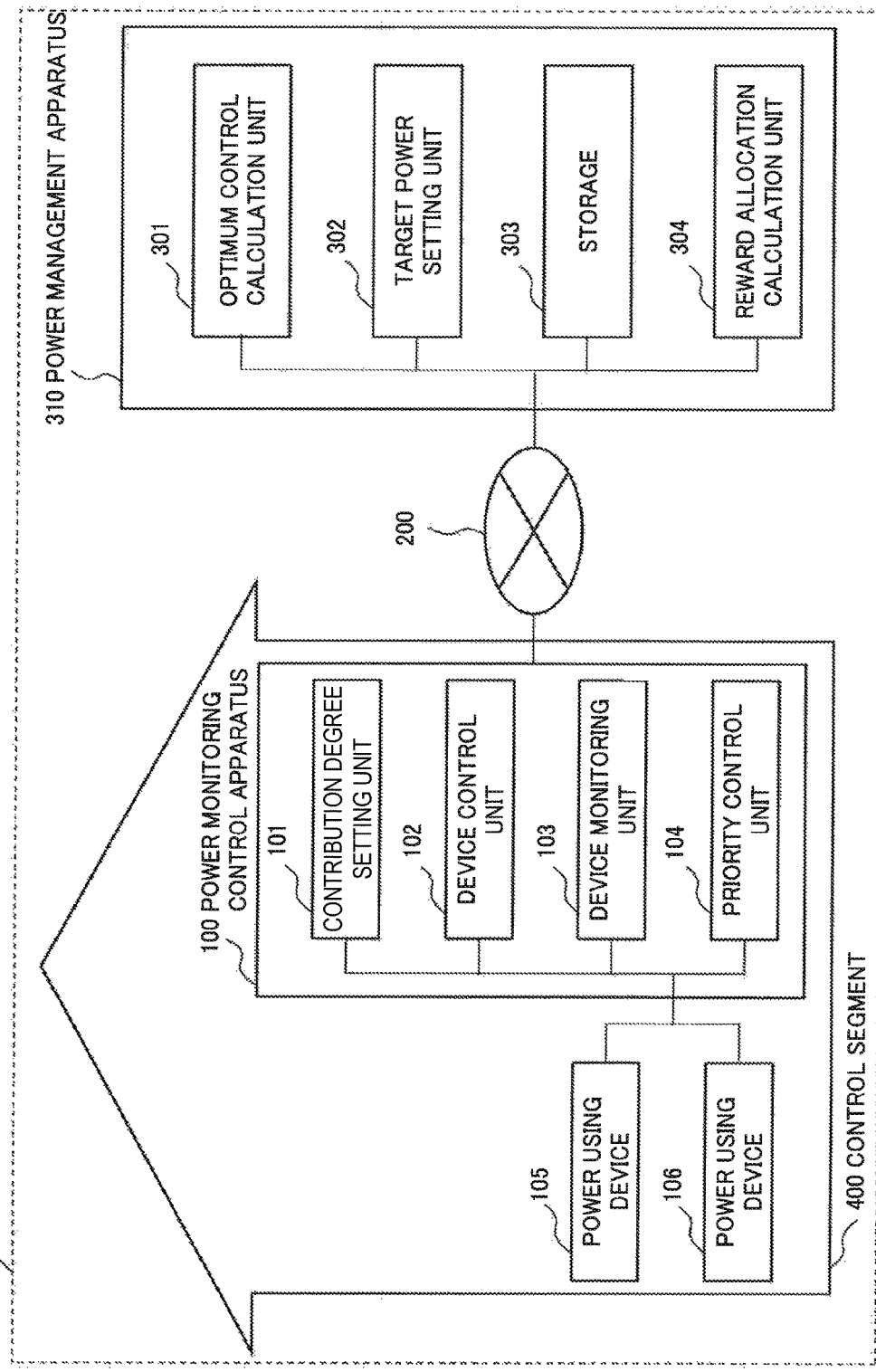
FIG. 10 is a block diagram illustrating a partial configuration of a power control system 1010 according to a second example embodiment of the present invention.

FIG. 10 is a block diagram illustrating a partial configuration of a power control system 1010 according to the second example embodiment of the present invention. FIG. 10 depicts the configuration of a power management apparatus 310, with illustration of only a control segment 400 of control segments connected to the power management apparatus 310 via a communication network 200.

Referring to FIG. 10, the power control system 1010 according to the present example embodiment includes a power management apparatus 310 in place of the power management apparatus 300, compared to that according to the first example embodiment. Further, the power management apparatus 310 additionally includes a reward allocation calculation unit 304, compared to the power management apparatus 300.

The reward allocation calculation unit 304 calculates the amount of money allocated to each control segment based on the degree of contribution when there occurs a reward for power reduction in an entire community to which the control segment 400 belongs, such as a reward from a power company or a negawatt transaction-related reward.

The operation of the power control system 1010 will be described below with reference to a flowchart illustrated in FIG. 11.

FIG. 11 is a flowchart illustrating an overview of an operation for reward allocation calculation by the power control system 1010 according to the second example embodiment. The process according to this flowchart may be performed in accordance with the programmed control by the CPU described earlier.

The reward allocation calculation unit 304, first, obtains information concerning a reward for power reduction in the entire community (step S301), as illustrated in FIG. 11. As an example, the amount of reward money for power reduction in the entire community is set to ¥150,000.

The reward allocation calculation unit 304 then obtains information concerning the degree of contribution of each control segment from a storage 303 (step S302). The obtained information concerning the degree of contribution is as illustrated in FIG. 3.

The reward allocation calculation unit 304 calculates a reward for each control segment (step S303) as:

Reward of Each Control Segment=Reward for Power Reduction in Entire Community×(Degree of Contribution of Each Control Segment)/(Sum Total of Degrees of Contribution of All Control Segments)

More specifically, this yields a reward of 150,000×(0.8)/(0.8+0.6+0.4)=¥66,667 for the control segment 400. Such calculation also yields a reward of ¥50,000 for the control segment 410 and a reward of ¥33,333 for the control segment 420.

With the above-mentioned operations, the power control system 1010 ends the operation for reward allocation calculation.

The advantageous effect of the second example embodiment of the present invention will be described below.

The above-described power control system 1010 according to the present example embodiment can fairly allocate rewards for power reduction obtained in the community.

This can be achieved because of the inclusion of the following configurations. That is, first, the reward allocation calculation unit 304 obtains information concerning the degree of contribution of each control segment. Second, the reward allocation calculation unit 304 calculates a reward based on the ratio in degree of contribution of each control segment in the entire community. Therefore, since a control segment which contributes to a higher degree is given a greater reward, the power control system 1010 can fairly allocate rewards for power reduction obtained in the community.

The functions of the respective components in each example embodiment of the present invention, described above, can be implemented not only in hardware but also in a computer apparatus based on program control or firmware. Programs are provided as recorded on a computer-readable recording medium such as a magnetic disk or a semiconductor memory, and is read by a computer at the time of, for example, start-up of the computer. The read programs control the operation of the computer to make the computer function as the components in each example embodiment described earlier.

Although the present invention has been described above with reference to each example embodiment, the present invention is not limited to the above-described example embodiments. Various changes which would be comprehended by those skilled in the art can be made to the configurations or details of the present invention within the scope of the present invention.

For example, the respective components described above in each example embodiment need not always be independent. Each such component may be implemented as, for example, a set of components forming a single module, or a single component formed by a set of modules. Each such component may even be implemented as a configuration including one component serving as a part of another component, or including partially overlapping, different components.

In each of the above-described example embodiments, a plurality of operations have been described in sequence in the form of a flowchart, but the order of description does not limit the order in which the plurality of operations are performed. Therefore, in carrying out each example embodiment, the order of a plurality of operations can be changed without posing any problem in detail.

The present invention has been described above with reference to the above-described example embodiments as typical examples. However, the present invention is not limited to the above-described example embodiments. In other words, various aspects which would be understood by those skilled in the art are applicable to the present invention within the scope of the present invention.

This application claims priority based on Japanese Patent Application No. 2014-253548 filed on Dec. 16, 2014, the disclosure of which is incorporated herein in its entirety.

REFERENCE SIGNS LIST 10, 16 . . . communication interface
11 . . . CPU
12 . . . output device
13 . . . input device
14 . . . main storage device
15 . . . secondary storage device
17 . . . control unit
18 . . . power supply unit
19 . . . device
100, 110, 120 . . . power monitoring control apparatus
101 . . . contribution degree setting unit
102 . . . device control unit
103 . . . device monitoring unit
104 . . . priority control unit
105, 106 . . . power using device
200 . . . communication network
300, 310 . . . power management apparatus
301 . . . optimum control calculation unit
302 . . . target power setting unit
303 . . . storage
304 . . . reward allocation calculation unit
400, 410, 420 . . . control segment
1000, 1010 . . . power control system

What is claimed is:

1. A power control system comprising: a power management apparatus and a power monitoring control apparatus provided for each control segment,
the power monitoring control apparatus comprising:
a processor and a memory storing therein program, wherein the processor is configured to execute the program to:
set a degree of contribution in the each control segment;
control a power consumption of each power using device to be connected in the each control segment, based on a control command from the power management apparatus;
set a priority for reducing power of the each power using device; and
obtain the priority of the each power using device that has been set and transmit the obtained priority to the power management apparatus,
wherein the power management apparatus determines the control command for controlling the each power using device connected, based on a target value of a total power consumption of all the control segments, and the priority of the each power using device provided for the each control segment, the priority being corrected with the degree of contribution obtained from the power monitoring control apparatus provided for the each control segment and that has been set, the priority being corrected by multiplication of the priority and the degree of contribution, and transmits the determined control command to the each power monitoring control apparatus provided for the each control segment.

2. The power control system according to claim 1, wherein the processor is configured to execute the program to further calculate an amount of reward money for power reduction allocated to the each control segment, based on the degree of contribution obtained from the power monitoring control apparatus of the each control segment and that has been set.

3. A power management apparatus which determines a control command for controlling each power using device to be connected, based on a target value of a total power consumption of all control segments to be connected, and a priority of the each power using device provided for the each control segment, the priority being corrected with a degree of contribution set by a power monitoring control apparatus provided for the each control segment and that has been set, the priority being corrected by multiplication of the priority and the degree of contribution, and transmits the determined control command to the each power monitoring control apparatus provided for the each control segment.

4. A power control method comprising:
by a power monitoring control apparatus,
setting a degree of contribution in a control segment to which the power monitoring control apparatus belongs, and
setting a priority for reducing power of each power using device in the control segment;
by a power management apparatus, determining a control command for controlling the each power using device to be connected, based on a target value of a total power consumption of all control segments to be connected, and a priority of the each power using device provided for the each control segment, the priority being corrected with the degree of contribution set by a power monitoring control apparatus provided for the each control segment and that has been set, the priority being corrected by multiplication of the priority and the degree of contribution, and transmits the determined control command to the each power monitoring control apparatus provided for the each control segment; and
by the power monitoring control apparatus, controlling a power consumption of the each power using device to be connected, based on the control command from the power management apparatus.

5. The power control method according to claim 4, wherein the power management apparatus calculates an amount of reward money for power reduction allocated to the each control segment, based on the degree of contribution set by the power monitoring control apparatus of the each control segment.

* * * * *